United States Patent Office 3,450,182
Patented June 17, 1969

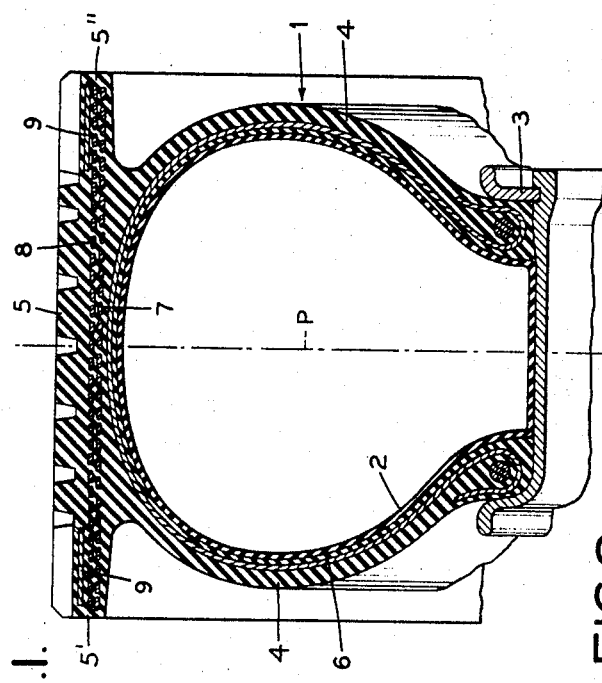
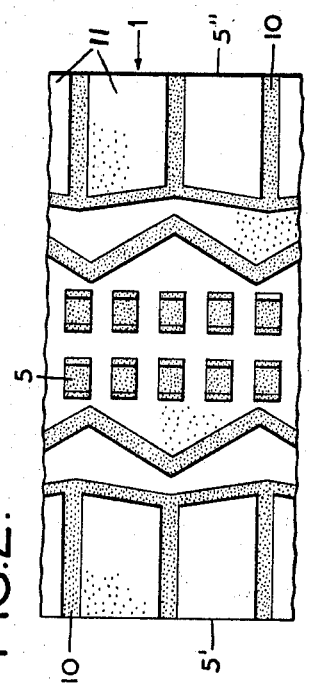
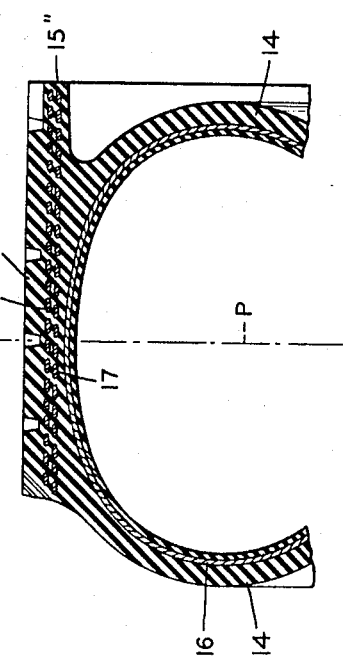
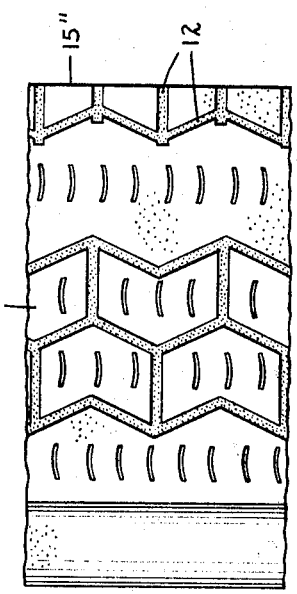
INVENTOR
HENRI VERDIER

3,450,182
PNEUMATIC TIRE CASINGS
Henri Verdier, Beauregard-L'Eveque, France, assignor to Compagnie Generale des Etablissements Michelin, raison sociale Michelin & Cie, Clermont-Ferrand, Puy-de-Dome, France
Filed July 13, 1966, Ser. No. 564,839
Claims priority, application France, July 13, 1965, 24,636
Int. Cl. B60c 19/00, 3/00
U.S. Cl. 152—352                 4 Claims

ABSTRACT OF THE DISCLOSURE

A pneumatic tire is provided with a tread having one or both edge portions extending outwardly beyond the sidewalls respectively adjacent thereto when the sidewalls are flexed under normal load. Reinforcing is provided in and spanning the tread substantially from edge to edge thereof. The tread thus protects the sidewalls from damage by shock or abrasion caused by obstacles striking the sidewalls.

---

The present invention refers to improvements in pneumatic tires and more specifically to tires of the radial carcass type, i.e., tires having carcasses which consists of wires or cords arranged in radial planes or forming narrow angles with the radial planes.

It is known that tires with a radial carcass having a rigid peak reinforcement cause the carcass cords to work under optimum conditions, in particularly, for carrying of loads and withstanding the inflation pressures. Furthermore, when steel cords are used to form a radial carcass, a single layer of cords suffices even for the heaviest tires. Nevertheless, due to the fact that, in a radial carcass, all reinforcing cords in any given zone of the sidewalls are practically parallel and comparatively numerous, the sidewalls sometimes are susceptible to damage by shock or abrasion caused by obstacles striking the sidewalls. In most instances, the resiliency of the sidewalls enables them to deform without damage. However, there are limits to the strains they can endure without suffering damage. In particular, the sidewalls of a tire running on rough or rocky terrain, for example, on construction sites or in quarries, are subjected to heavy stresses and abrasion and impact against not only the tread but against the sidewalls. The same is true for the conventional tire with crossed or bias-laid carcass plies. However, in the case of a tire having radial carcass, there is more opportunity for accidental damage to the sidewalls because of the greater normal operating life of the tire.

In accordance with the present invention, means are provided to protect the sidewalls of tires, and more specifically, the sidewalls of tires with radial carcasses, from shocks and abrasion by obstacles in or close to their paths and to improve the road grip or traction of the tire.

More particularly, a radial carcass tire in accordance with the invention is provided with a tread which extends laterally beyond the zone at which it is joined to the carcass and is of such width that the outer edge of the laterally extending portion of the tread is located at a greater distance from the median plane of symmetry of the carcass than the outermost portion of the sidewall, and is rigidified by at least two plies of crossed cords, preferably metal cables, spanning the tread and extending beyond the outermost portion of the sidewall.

In accordance with one form of the invention, the tire is symmetrical and has a laterally extending tread portion on each side thereof.

In accordance with another form of the invention, especially for a passenger car tire, the lateral extension of the tread is provided on one side only, i.e., the outer side of the tire as it is mounted on the vehicle.

Each laterally extending portion of the tread acts to push aside displaceable obstacles, such as rocks and to deflect the tire away from heavy obstacles, such as curbstones, embedded rocks and the like. The protective tread extension can serve this purpose only if it is sufficiently rigid to keep the sidewall of the tire out of contact with the obstacle, and thus avoid damaging of the sidewall, particularly at the portion of the tire which projects outwardly farthest from the rim. The necessary rigidity is obtained by the two plies of wires in the tread and can be increased, if necessary, by including one or more additional stiffening plies in the laterally extending portion of the tread.

Furthermore, advantage is taken of the lateral extension or extensions to improve the characteristics of the tire. In accordance with the invention, the extension or extensions are provided with wide transverse tread blocks or moldings defined by narrow longitudinal grooves in the tread. Inasmuch as the tread extensions are spaced from the casing and afford a wide ground-contacting area, the tire behaves similar to a caterpillar track and has better road-holding ability than conventional tires on loose terrain or muddy ground.

In the case of a passenger car tire in accordance with the invention, with a tread extended laterally on one side only, the increase of width of the zone of contact with the ground obtained by the lateral extension enables deeper or more numerous grooves to be formed in the tread, especially in the laterally extending portion, which improve the traction on all kinds of road surfaces, and especially on smooth and wet pavements.

The invention will be more fully understood by reference to the accompanying drawings, in which:

FIGURE 1 is a radial cross-sectional view of a heavy duty tire having a tread extended laterally on both sides of the tire;

FIGURE 2 is a plan view of a portion of the tread of the tire shown in FIGURE 1; and FIGURES 3 and 4 are, respectively, a view in partial radial cross-section and a plan view of a portion of a tire having the tread extended laterally only on one side thereof.

In FIGURES 1 and 2, the tire 1 and its inner tube 2 are mounted on a rim 3 of the demountable flange type. The tire 1 has two sidewalls 4 and a tread 5. The carcass 6 is composed of radial cords, e.g., cords or cables formed of natural or synthetic textile filaments, metal filaments or the like. The tread 5 is reinforced by two piles 7 and 8 of cords or cables which form angles of approximately 17° with the median plane P of symmetry of the carcass 6. In accordance with the invention, the tread 5 and its reinforcement are extended laterally beyond the zone of contact with the carcass, and the width is such that each of the ends 5′ and 5″ is further removed from the median plane P than the zone of widest expansion of each of the sidewalls. In the overhanging portions of the tread, the tread may be reinforced further, for example, by a ply 9 consisting of transverse cords forming a triangulated relation with the cords of the plies 7 and 8. Likewise, in accordance with the invention, the overhanging portions of the tread are provided with transversely extending grooves 10 forming tread blocks 11 of substantial size therebetween.

The embodiment of the invention disclosed in FIGURES 3 and 4 is a tire for a passenger car. This tire has a tread 15 containing reinforcing plies 17 and 18 of metallic or non-metallic cords. The tread extends laterally only on one side of the median plane of symmetry P of the carcass 16 and has its ends 15″ overhanging the sidewall 14 a greater distance from the plane P than that portion of the sidewall 14 which is at the greatest distance from the plane P. The overhanging portion 15″ is provided with grooves 12 which extend generally longitudinally and transversely of the tread.

Inasmuch as the cords which extend across or span the tread of each of these tires enhance the rigidity of the overhanging portion of the tread which is formed of conventional tread rubber of high abrasion resistance and has some considerable rigidity in itself, the laterally extending portion or portions of the tread serve as a shield or guard against damage to the sidewall of the tire. When a laterally extending portion of the tread strikes a rock or other movable obstacle the lateral extension of the tread will deflect and force the rock or other obstacle away from the tire and prevent it from coming in contact with the sidewall of the tire. If a larger, relatively immovable object is struck, such as a curb or a large rock, or an embedded rock, the laterally extending portion of the tread has sufficient rigidity to deflect the tire itself away from the obstacle and thereby prevent contact of the sidewall with the obstacle. In this way, the sidewalls of the tire are protected and the longevity of the sidewalls is improved to to render it commensurate with the inherent long life of the remainder of the tire arising from the use of a radial carcass and reinforced crown or peak plies in the tire.

It will be understood that tires of the type embodying the present invention are susceptible to considerable modification in the number of reinforcing plies in the tread, as well as variation in the number and arrangement of plies used in the lateral extension or extensions of the tread, and also in the tread pattern of the tire.

I claim:
1. A pneumatic tire comprising a casing having a carcass formed with at least one radial cord ply, sidewalls and beads at the edges of said sidewalls, a tread on said casing made of abrasion-resistant rubber and having at least one edge portion extending laterally and spaced from said casing and having a free edge extending outwardly beyond the sidewall adjacent thereto when said sidewall is flexed under normal load, and at least two crossed plies of rigidifying cords in and spanning said tread substantially from edge to edge thereof, said tread being substantially flat and having a constant width and shape under all conditions of load, said sidewalls being free of said rigidifying cords, and said free edge of said tread being formed with grooves to improve roadability.

2. The tire set forth in claim 1 in which said cords are metallic cables.

3. The tire set forth in claim 1 in which said tread has laterally extending free edge portions on each side thereof.

4. The tire set forth in claim 1 comprising at least one additional reinforcing ply in the free edge portion of said tread.

References Cited

UNITED STATES PATENTS

| | | | |
|---|---|---|---|
| 2,477,754 | 8/1949 | Kraft | 152—166 |
| 1,189,223 | 7/1916 | Albrecht | 152—352 |
| 2,108,329 | 2/1938 | Carter | 152—352 |
| 2,884,040 | 4/1959 | Boussu et al. | 152—361 |
| 3,195,604 | 7/1965 | Boussu et al. | 152—361 |

FOREIGN PATENTS

| | | |
|---|---|---|
| 115,945 | 5/1918 | Great Britain. |
| 1,059,542 | 11/1953 | France. |

ARTHUR L. LA POINT, *Primary Examiner.*

CHARLES B. LYON, *Assistant Examiner.*

U.S. Cl. X.R.

152—353